(12) United States Patent
Kutilek et al.

(10) Patent No.: US 7,431,992 B2
(45) Date of Patent: Oct. 7, 2008

(54) COATED SUBSTRATES THAT INCLUDE AN UNDERCOATING

(75) Inventors: Luke A. Kutilek, Oakmont, PA (US);
Caroline Harris, Pittsburgh, PA (US);
Patricia R. Athey, Pittsburgh, PA (US);
Songwei Lu, Wexford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 10/914,356

(22) Filed: Aug. 9, 2004

(65) Prior Publication Data

US 2006/0029813 A1 Feb. 9, 2006

(51) Int. Cl.
*B32B 9/00* (2006.01)

(52) U.S. Cl. .................. 428/426; 428/432; 428/701; 428/702

(58) Field of Classification Search ............. 428/411.1, 428/426, 428, 432
See application file for complete search history.

(56) References Cited

U.S. PATENT DOCUMENTS

| | | | |
|---|---|---|---|
| 3,083,551 A | 4/1963 | Pilkington | 65/32 |
| 3,220,816 A | 11/1965 | Pilkington | 65/99 |
| 3,660,061 A | 5/1972 | Bach | 260/78 R |
| 3,843,346 A | 10/1974 | Edge et al. | 65/65 A |
| 4,111,150 A | 9/1978 | Donley et al. | 118/7 |
| 4,187,336 A | 2/1980 | Gordon | 423/34 |
| 4,377,613 A | 3/1983 | Gordon | 428/212 |
| 4,379,049 A | 4/1983 | Bassett | 209/464 |
| 4,719,126 A | 1/1988 | Henery | 427/165 |
| 4,719,127 A | 1/1988 | Greenberg | 427/165 |
| 4,853,257 A | 8/1989 | Henery | 427/166 |
| 4,861,669 A | 8/1989 | Gillery | 428/434 |
| 4,900,633 A | 2/1990 | Gillery | 428/432 |
| 4,971,843 A | 11/1990 | Michelotti et al. | 428/34 |
| 5,028,759 A | 7/1991 | Finley | 219/203 |
| 5,135,581 A * | 8/1992 | Tran et al. | 136/256 |
| 5,234,737 A * | 8/1993 | Ueno et al. | 428/64.4 |
| 5,464,657 A | 11/1995 | Athey et al. | 427/255.5 |
| 5,543,229 A * | 8/1996 | Ohsaki et al. | 428/432 |
| 5,599,387 A | 2/1997 | Neuman et al. | 106/287.14 |
| 5,653,903 A | 8/1997 | Pinchok, Jr. et al. | 219/203 |
| 5,948,131 A | 9/1999 | Neuman | 65/60.2 |
| 6,027,766 A * | 2/2000 | Greenberg et al. | 427/226 |
| 6,362,121 B1 * | 3/2002 | Chopin et al. | 502/2 |
| 6,413,581 B1 | 7/2002 | Greenberg et al. | 427/226 |
| 6,465,088 B1 * | 10/2002 | Talpaert et al. | 428/307.3 |
| 6,737,145 B1 * | 5/2004 | Watanabe et al. | 428/64.4 |
| 6,816,297 B1 * | 11/2004 | Tonar et al. | 359/265 |
| 2004/0180218 A1 * | 9/2004 | Nagashima et al. | 428/432 |

FOREIGN PATENT DOCUMENTS

| | | |
|---|---|---|
| EP | 1 056 136 A1 | 11/2000 |
| EP | 1 061 586 A2 | 12/2000 |
| EP | 1 422 761 A1 | 5/2004 |

* cited by examiner

*Primary Examiner*—Timothy M Speer
(74) *Attorney, Agent, or Firm*—Andrew C. Siminerio

(57) ABSTRACT

A coated substrate is disclosed. The coated substrate includes a substrate; an undercoating having one or more materials selected from tin oxide, silica, titania, alumina, zirconia, zinc oxide and alloys and mixtures thereof nitrides of titanium, zirconium, hafnium, silicon, aluminum and mixtures thereof, and oxy-nitrides of titanium, zirconium, hafnium, silicon, aluminum and mixtures thereof overlaying at least a portion of the substrate; and a functional coating overlaying at least a portion of the undercoating. As a result of the undercoating, the coated substrate can exhibit improved properties such as improved aesthetic properties, increased durability, photocatalytic activity, mechanical durability, etc.

7 Claims, No Drawings

COATED SUBSTRATES THAT INCLUDE AN UNDERCOATING

The present invention relates to novel coating compositions, especially coating compositions that can be used as an undercoating for a functional coating.

BACKGROUND

Substrates such as glass and steel are used to make buildings, appliances, cars, etc. Oftentimes, it is necessary to apply a functional coating(s) over the substrate to achieve certain performance properties. Examples of functional coatings are electroconductive coatings, photocatalytic coatings, low emissivity coatings, hydrophilic coatings, hydrophobic coatings, anti-reflective coatings, etc.

Typically, the functional coating is deposited directly on the substrate. When the functional coating is deposited directly on the substrate, the coated substrate can fail to achieve the desired performance, have poor durability and exhibit undesirable aesthetic properties. For example, a functional coating applied directly on a substrate may fail to exhibit a desired performance such as a specified amount of photocatalytic activity or exhibit poor durability by peeling off or changing color. As another example, a functional coating deposited directly on a substrate may exhibit undesirable aesthetic properties such as increased reflectance and/or unwanted color.

The present invention provides a substrate coated with a novel undercoating and a functional coating that is applied over the undercoating. The coated substrate according to the present invention can exhibit improved performance properties such as aesthetic properties, durability, photocatalytic activity, mechanical durability, etc.

SUMMARY OF THE INVENTION

In a non-limiting embodiment, the present invention is a coated substrate comprising a substrate; an undercoating comprised of one or more materials selected from tin oxide, silica, titania, alumina, zirconia, zinc oxide and alloys and mixtures thereof, nitrides of titanium, zirconium, hafnium, silicon, aluminum and mixtures thereof, and oxy-nitrides of titanium, zirconium, hafnium, silicon, aluminum and mixtures thereof overlaying at least a portion of the substrate; and a functional coating overlaying at least a portion of the undercoating.

In another non-limiting embodiment, the invention is a coated substrate comprising a substrate having an index of refraction; an undercoating having an index of refraction comprised of one or more materials selected from tin oxide, silica, titania, alumina, zirconia, zinc oxide and alloys and mixtures thereof deposited on at least a portion of the substrate; and a functional coating having an index of refraction deposited on at least a portion of the undercoating, wherein the undercoating has an index of refraction that is greater than or equal to the index of refraction of the substrate and less than or equal to the index of refraction of the functional coating and the coated substrate has a visible reflectance of no greater than 25%.

In yet another non-limiting embodiment, the present invention is a method for enhancing the aesthetic properties of a substrate coated with a functional coating comprising applying an undercoating having an index of refraction on at least a portion of a substrate; and applying a functional coating having an index of refraction on at least a portion of the undercoating, wherein the undercoating has an index of refraction greater than or equal to the index of refraction of the substrate and less than or equal to the index of refraction of the functional coating and the coated substrate has a visible reflectance no greater than 25%.

BRIEF DESCRIPTION OF THE INVENTION

All numbers expressing dimensions, physical characteristics, quantities of ingredients, reaction conditions, and the like used in the specification and claims are to be understood as being modified in all instances by the term "about". Accordingly, unless indicated to the contrary, the numerical values set forth in the following specification and claims may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1.0 to 7.8, 3.0 to 4.5, and 6.3 to 10.0.

As used herein, spatial or directional terms, such as "left", "right", "inner", "outer", "above", "below", "top", "bottom", and the like, are understood to encompass various alternative orientations and, accordingly, such terms are not to be considered as limiting.

As used herein, the terms "on", "applied on/over", "formed on/over", "deposited on/over", "overlay" and "provided on/over" mean formed, deposited, or provided on but not necessarily in contact with the surface. For example, a coating layer "formed over" a substrate does not preclude the presence of one or more other coating layers of the same or different composition located between the formed coating layer and the substrate. For instance, the substrate can include a conventional coating such as those known in the art for coating substrates, such as glass or ceramic.

A non-limiting embodiment of the present invention is a substrate coated with an undercoating and a functional coating. The undercoating overlays at least a portion of the substrate and can comprise a single layer of coating or multiple layers of coating. In a non-limiting embodiment of the invention, the undercoating is a single layer of coating comprised of one or more of the following materials: tin oxide, silica ($SiO_2$), titania ($TiO_2$), alumina ($Al_2O_3$), zirconia ($ZrO_2$), and zinc oxide (ZnO) as well as alloys and mixtures (e.g., binary, ternary, etc.) thereof.

In another non-limiting embodiment of the invention, the undercoating is a single layer comprised of a mixture of titania and silica; silica and tin oxide; alumina and tin oxide; alumina and zirconia; alumina and zinc oxide; silica and zirconia; silica and zinc oxide; alumina and silica; titania and alumina; or a mixture of silica, titania and alumina. Mixtures of the described materials can be made according to methods which are well known in the art. Suitable mixtures comprise every combination of ranges for the aforementioned materials including ternary and quaternary combinations. The exact composition of the mixture will depend on the required properties of the undercoating such as the deposition properties, film durability, aesthetic properties, permeability, crystallinity, etc.

When the undercoating is comprised of a mixture of materials, the composition of the undercoating can be homogeneous throughout, vary randomly throughout the layer, or have a graded progression. For example, the undercoating can be made of a mixture of two materials, a first material and a second material, and have a composition that varies in a graded progression between interfaces such as, for example, a substrate and a functional coating. The composition of the undercoating adjacent to the substrate can be composed primarily of or exclusively of the first material and as the distance from the substrate increases, the concentration of the first material in the undercoating decreases and the concentration of the second material in the undercoating increases. At a certain distance from the substrate, the composition of the undercoating can be predominantly or exclusively comprised of the second material. As another example, the graded progression can be a step-wise variation or a graded progression in which the concentration of the materials peak and drop off one or more times within the undercoating.

In a non-limiting embodiment of the invention, the change in the concentration of the materials is linear.

In yet another non-limiting embodiment of the invention, the undercoating has a multi-layer configuration. The individual layers of the multilayered coating can be homogenous or a combination of materials as discussed above with reference to the single layer undercoating. The configuration of the layers will depend on the required properties of the undercoating such as deposition properties, film durability, aesthetic properties, permeability, crystallinity, etc. For example, the last layer in the multi-layer configuration can be used to influence the structure and properties of the functional layer and one or more of the other layers can act as a diffusion barrier. In a non-limiting embodiment of the invention having a multi-layer configuration, the undercoating comprises a layer of silica over a layer of tin oxide.

The undercoating of the present invention can be applied using conventional application techniques such as chemical vapor deposition ("CVD"), spray pyrolysis, atmospheric plasma deposition and magnetron sputtered vacuum deposition ("MSVD") as are well known in the art.

Suitable CVD methods of deposition are described in the following references which are hereby incorporated by reference: U.S. Pat. Nos. 4,853,257; 4,971,843; 5,464,657; 5,599,387; and 5,948,131.

Suitable spray pyrolysis methods of deposition are described in the following references which are hereby incorporated by reference: U.S. Pat. Nos. 4,719,126; 4,719,127; 4,111,150; and 3,660,061.

Suitable MSVD methods of deposition are described in the following references which are hereby incorporated by reference: U.S. Pat. Nos. 4,379,040; 4,861,669; and 4,900,633.

The undercoating of the present invention can be any thickness. The exact thickness of undercoating is determined by the functional coating that overlays the undercoating as well as the end use of the coated substrate.

According to the present invention, a functional coating overlays at least a portion of the undercoating. The functional coating can be any type known in the art. The functional coating can be a single layer coating or a multiple layer coating. As used herein, the term "functional coating" refers to a coating that modifies one or more physical properties of the substrate over which it is deposited, e.g., optical, thermal, chemical or mechanical properties, and is not intended to be entirely removed from the substrate during subsequent processing. The functional coating can have one or more layers of coating having the same or different composition or functionality.

For example, the functional coating can be a photocatalytic coating like the one described in U.S. Pat. No. 6,413,581, which is hereby incorporated by reference. A photocatalytic coating can be applied on a substrate so that the substrate can be cleaned relatively easily and/or infrequently. The photocatalytic coating can be any material that can be activated using radiation to have catalytic activity. Examples of suitable photocatalytic coatings include, but are not limited to, one or more metal oxides. A non-limiting list of suitable metal oxides includes titanium oxides, iron oxides, copper oxides, tungsten oxides, mixtures of zinc oxides and tin oxides, strontium titanate and mixtures thereof. The metal oxide(s) can include super-oxides or sub-oxides of the metal. Titania in its various crystal forms, such as anatase form, can be used in the photocatalytic coating.

Typically, a photocatalytic coating is activated using radiation in the ultraviolet range, e.g. 220-400 nm of the electromagnetic spectrum. Suitable sources of ultraviolet radiation include natural sources like solar radiation and artificial sources like black light or an ultraviolet light source.

The functional coating can also be an electrically conductive coating, such as, for example, an electrically conductive coating used to make heatable windows as disclosed in U.S. Pat. Nos. 5,653,903 and 5,028,759, which are hereby incorporated by reference, or a single-film or multi-film coating used as an antenna. The functional coating can also be a solar control coating. As used herein, the term "solar control coating" refers to a coating comprised of one or more layers or films which affect the solar properties of the coated article, such as but not limited to the amount of visible, infrared, and/or ultraviolet radiation reflected from on and/or passing through the coated article, shading coefficient, emissivity, etc. The solar control coating can block, absorb or filter selected portions of the solar spectrum, such as but not limited to the IR, UV, and/or visible spectrums. Examples of solar control coatings that can be used in the practice of the invention are found, for example but not to be considered as limiting, in U.S. Pat. Nos. 4,898,789; 5,821,001; 4,716,086; 4,610,771; 4,902,580; 4,716,086; 4,806,220; 4,898,790; 4,834,857; 4,948,677; 5,059,295; and 5,028,759, and also in U.S. patent application Ser. No. 09/058,440, which are hereby incorporated by reference.

The functional coating can also be a low emissivity coating. A substrate coated with a low emissivity coating exhibits an emissivity less than 0.4, such as less than 0.3, such as less than 0.2, such as less than 0.1, e.g., less than or equal to 0.05. Examples of low emissivity coatings are found, for example, in U.S. Pat. Nos. 4,952,423 and 4,504,109 and British Patent GB 2,302,102, which are hereby incorporated by reference.

The functional coating can include one or more metals, non-metals, semi-metals, semiconductors, and/or alloys, compounds, composites, combinations, single or multiple phases or blends thereof. For example, the functional coating can be a single layer metal oxide coating, a multiple layer metal oxide coating, a non-metal oxide coating, a metallic nitride or oxynitride coating, or a non-metallic nitride or oxynitride coating, or a multiple layer coating.

Non-limiting examples of functional coatings that can be used in the present invention are commercially available from PPG Industries, Inc. of Pittsburgh, Pa. under the SunClean®, SUNGATE® and SOLARBAN® families of coatings. Such functional coatings can include one or more anti-reflective coating films comprising dielectric or anti-reflective materials, such as metal oxides or oxides of metal alloys, which are transparent to visible light. The functional coating also includes one or more infrared reflective films comprising a reflective metal, e.g., a noble metal such as gold, copper or silver, or combinations or alloys thereof, and can further comprise a primer film or barrier film, such as titanium, as is known in the art, located over and/or under the metal reflective layer. The functional coating can have any desired number of infrared reflective films, such as one or more silver layers, e.g., two or more silver layers, e.g., three or more silver layers.

According to the present invention, the functional coating can be applied over the undercoating using any of the conventional methods described above in reference to the undercoating. One skilled in the art knows which application techniques can be used based on the type of functional coating and undercoating contained in the embodiment.

In a non-limiting embodiment of the present invention, the functional coating is at least 20 nm thick, for example at least 50 nm, or at least 500 nm.

Suitable substrates for use in the present invention include, but are not limited to, glass, ceramic, etc. Glass used in the present invention can be made via conventional float glass processes. Suitable float processes are described in U.S. Pat. Nos. 3,083,551; 3,220,816; and 3,843,346, which are hereby incorporated by reference.

In a non-limiting embodiment of the invention, the substrate is a glass float ribbon and the undercoating and/or functional coating are applied during the glass manufacturing process.

In another non-limiting embodiment of the invention, the substrate is a glass float ribbon and the undercoating and the functional coating are applied off-line (after the glass manufacturing process). The off-line coating process can include physical vapor deposition, e.g. sputter deposition, or chemical vapor deposition, e.g. thermal or plasma assisted chemical vapor deposition.

In another non-limiting embodiment of the invention, the substrate is a glass float ribbon and the undercoating is applied on-line during the glass manufacturing process and the functional coating is applied off-line.

Coated substrates according to the present invention can be used to make buildings, vehicles, display monitors such as television screens, computer screens, and touch screens. The coated substrates of the invention can be included in laminated and monolithic configurations as well as in insulating structures, e.g. multiple insulating glazing units.

In a non-limiting embodiment of the invention, the undercoating is used to provide a coated substrate with improved aesthetic properties (this embodiment is referred to herein as the "aesthetic enhancing embodiment"). In the aesthetic enhancing embodiment, the overall index of refraction of the undercoating is greater than or equal to the index of refraction of the substrate and less than or equal to the index of refraction of the functional coating. In a typical application, the index of refraction of the undercoating will range from 1.4 to 2.6 depending on the specific composition and thickness of the substrate and the specific composition and thickness of the functional coating.

Table 1 shows the indices of refraction at a wavelength of 500 nm for some materials that can be used to make up the undercoating.

TABLE 1

| Material | Index of Refraction |
| --- | --- |
| Tin oxide ($SnO_2$) | 2.0 |
| Silica ($SiO_2$) | 1.4 |
| Titania ($TiO_2$) | 2.6 |
| Alumina ($Al_2O_3$) | 1.8 |

The values listed in Table 1 can vary depending on the material's crystallinity or crystal structure. Similarly, the index of refraction of a layer comprised of such material can vary depending on, among other things, deposition conditions.

The index of refraction of a material can be modified using doping techniques, which are well known in the art, to create an undercoating with the proper index of refraction. For example, in a non-limiting embodiment of the invention, the undercoating is comprised of fluorine doped tin oxide. The fluorine doped tin oxide will have an index of refraction that is less than the index of refraction of pure tin oxide with the specific index dependant on the amount of dopant.

When the undercoating comprises a mixture of materials, the composition of the undercoating can be adjusted in a multitude of ways to make the index of refraction of the undercoating fall within a desired range. The following describes how the overall index of refraction of an undercoating comprised of two materials having different indices of refraction—a first material and a second material—can be manipulated to fall within a desired range. For example, an undercoating having an index of refraction greater than or equal to the index of refraction of a substrate and less than or equal to the index of refraction of a functional coating can be obtained by mixing a first material having an index of refraction that is lower than the index of refraction of the substrate and a second material having an index of refraction that is higher than the index of refraction of the substrate in the appropriate quantities so that the index of the mixed material layer is within the desired range. In another example, an undercoating having an index of refraction greater than or equal to the index of refraction of a substrate and less than or equal to the index of refraction of a functional coating can be obtained by mixing a first material and a second material that both have an indices of refraction that are greater than the index of refraction of the substrate but lower than the index of refraction of the functional coating. In yet another example, an undercoating having an index of refraction greater than or equal to the index of refraction of a substrate and less than or equal to the index of refraction of a functional coating can be obtained by mixing a first material having an index of refraction that is lower than the index of refraction of the substrate and a second material having an index of refraction that is higher than the index of refraction of the substrate. In a further example, an undercoating having an index of refraction greater than or equal to the index of refraction of a substrate and less than or equal to the index of refraction of a functional coating can be obtained by mixing a first material having an index of refraction that is equal to the index of refraction of the substrate and a second material having an index of refraction that is equal to the index of refraction of the functional coating.

When the undercoating is comprised of multiple layers of coating, the overall index of refraction of the undercoating can be manipulated in similar fashion as described above for the undercoating comprised of a mixture of one or more materials.

The overall index of refraction for an undercoating comprised of a mixture of materials or multiple layers can be calculated at a representative wavelength, such as 550 nm, using an optical modeling program, such as the one commercially available from J.A. Woollam Co., Inc. of Lincoln, Nebr., for variable angle of incidence spectroscopic ellipsometers. The indices of refraction for the substrate and the functional coating can be calculated using standard formulas that are well known in the art.

For a specific embodiment of the invention where there is a substrate having a specific index of refraction and thickness, an undercoating with a specific index of refraction, and a functional coating have a specific index of refraction and thickness, the optimum thickness of the undercoating required to produce the desired reflectance of the coated substrate can be determined using a thin film design program such as TFCalc™ thin film design software from Software Spectra, Inc. in Portland, Oreg. When the functional coating is a single layer comprising a mixture of materials or a multi-layer configuration, the appropriate inputs to describe the mixture or multi-layer coating must be entered into the software.

In a non-limiting aesthetic enhancing embodiment of the invention, the coated substrate exhibits a percent visible reflectance that is no greater than 25%, for example, no greater than 23%, or no greater than 20%. By properly choosing the undercoating and the thickness of the undercoating, the intensity of the energy reflected from the coated substrate over a given range of wavelengths and incident angles can be controlled.

The phenomena exhibited by the aesthetic enhancing embodiment of the invention can be best described as follows. Because light has wave properties, it exhibits interference effects. Light waves that are exactly in phase with each other undergo constructive interference. Light waves that are 180° out of phase with each other undergo destructive interference. For light waves that are not exactly in phase and not exactly 180° out of phase, the total amplitude of the reflected light is given by the vector resultant and the intensity is the square of the amplitude.

When light is incident on substrate coated with a multiple layer coating, some of the light is reflected from each of the coating interfaces and some of the light is transmitted. For example, a coated substrate comprising an aesthetic enhancing coating deposited on a glass substrate and a functional coating deposited on the aesthetic enhancing coating has three coating interfaces. There is an interface between the glass substrate and the aesthetic enhancing coating, another interface between the aesthetic enhancing coating and the functional coating, and a third interface between the functional coating and the ambient air. At each of the interfaces, some of the light is reflected and some is transmitted. For any given wavelength, the total intensity of reflected light depends in part on the amount of constructive interference between the light reflected from each of the interfaces. If all of the reflected waves destructively interfere, the total reflectance for that wavelength will be zero. For a specific substrate at given thickness and specific functional coating having a set thickness, the aesthetic enhancing coating of the present invention has the necessary index of refraction and thickness to minimize the reflected light.

In another non-limiting embodiment of the invention, the undercoating is used as a barrier layer to prevent mobile ions in the substrate from migrating to the surface and negatively interacting with the functional coating. In a non-limiting embodiment of the invention, an undercoating that is a barrier layer to alkali ions such as sodium ions overlays at least a portion of a glass substrate (alkali ions are mobile in glass) and a functional coating comprising a photocatalytic coating such as a titania coating overlays at least a portion of the undercoating. Such a coated substrate can exhibit increased durability and increased photocatalytic activity because the alkali ions are prevented from migrating to the surface.

Alkali ions are known to reduce the photocatalytic activity of titania coatings. It is not known exactly how the alkali ions interact with the titania to reduce photocatalytic activity, but it has been proposed that alkali ions may either be providing recombination sites for the electron-hole pairs and/or negatively affecting the crystal growth of the titania during deposition. Alkali ions can also adversely impact the durability of titania coatings. In the presence of water, alkali ions raise the pH of the water to a level that is corrosive to the glass silica network resulting in a failure at the interface between the coating and the glass surface.

In yet another non-limiting embodiment of the invention, the undercoating is used to influence the structure and performance of the functional coating. For example, an undercoating of tin oxide having a cassiterite structure can be used to cause a functional coating comprised of titania to be in the rutile phase rather than in the anatase phase. Titania in the rutile phase is more mechanically durable than titania in the anatase phase.

The present invention includes methods for making the coated substrate of the present invention and as well as using an undercoating to provide a coated substrate having improved performance properties. For example, the present invention encompasses a method for enhancing the aesthetic properties of a substrate by depositing an undercoating over at least a portion of the substrate and depositing a functional coating over at least a portion of the undercoating. A similar method can be used to provide a coated substrate having improved durability and other properties as a result of depositing an undercoating over at least a portion of the substrate that serves as a barrier layer. The method of the present invention can also include other processing steps such as annealing or tempering when the substrate is glass. Both of the aforementioned processing techniques are well known in the art.

The present invention provides coated substrates that exhibit improved performance properties, such as, improved durability, improved aesthetic properties (e.g., minimal reflectance), increased photocatalytic activity, etc.

EXAMPLES

The following non-limiting examples are included to illustrate the present invention. All of the data in the example section was modeled using TFCalc software.

The performance of the following coated substrate was modeled: an undercoating comprising a layer of silica over a layer of tin oxide is on a glass substrate. A functional coating layer comprising a layer of titania is over the aesthetic enhancing coating.

It is known in the art that visible reflectance values (Y) on the coated side of the coated substrate go up and down as the thickness of the coating layers increases. This stems from the fact that the reflectance of light from thin layers of coatings on glass follows the classic behavior of maxima and minima due to constructive and destructive interference of light waves. The reflectance of the light from thin coatings on glass can be calculated using the Fresnel formula as found in the American Institute of Physics Handbook, 3rd ed., edited by D E Gray (McGraw-Hill, New York, 1972).

Table 2 shows the software solutions for the minimum visible reflectance as discussed earlier. Chromaticity coordinates, x and y, are included for a given reflectance. The TFCalc software was run to find the optimum thickness(es) of both the tin oxide and the silica layers of the undercoating, as well as the optimum thickness(es) of the functional coating that resulted in minimum visible reflectance values. The TFCalc simulation was run with the following constraints: the combined thickness of the tin oxide layer and the silica layer could range from 0 nm to 160 nm, and the thickness of the titania layer could range from 20 nm to 125 nm.

TABLE 2

Minimum Reflectance Value Solutions for a Coated Substrate of the Present Invention

| Undercoating | | Functional Coating | | | |
|---|---|---|---|---|---|
| Tin oxide layer | Silica layer | Titania layer | Reflected Color* | | |
| [nm] | [nm] | [nm] | Y | x | y |
| 31.8 | 23.2 | 120.8 | 15.8 | 0.293 | 0.299 |
| 41.7 | 16.8 | 82.2 | 21.0 | 0.287 | 0.303 |
| 33.1 | 34.1 | 73.8 | 26.0 | 0.287 | 0.302 |
| 12.7 | 60.0 | 57.7 | 33.1 | 0.289 | 0.301 |
| 11.6 | 89.9 | 55.6 | 38.2 | 0.289 | 0.306 |
| 22.6 | 102.3 | 55.0 | 43.9 | 0.290 | 0.312 |
| 68.8 | 84.4 | 51.3 | 53.1 | 0.296 | 0.322 |

*CIE chromaticity coordinates 1976 for Illuminant C with a 2° Observer

Table 3 shows the effect on reflected color of increasing the thickness of a functional coating thickness for a given undercoating configuration. The reflected color—chromaticity values, x and y, and reflectance, Y, were determined for a coating configuration having an undercoating made up of a 31.8 nm thick layer of tin oxide and a 23.2 nm thick layer of silica and a titania functional coating ranging from 20 nm to 500 nm. The chromaticity values were determined using CIE chromaticity 1976 coordinates for Illuminant C with a 2° Observer.

TABLE 3

Variance of Reflectance and Color with Functional Coating Thickness for a Specific Undercoating

| Undercoating | | Functional Coating | | | |
|---|---|---|---|---|---|
| Tin oxide layer [nm] | Silica layer [nm] | Titania layer [nm] | Reflected Color | | |
| | | | Y | x | y |
| 31.8 | 23.2 | 20.0 | 17.3 | 0.321 | 0.335 |
| 31.8 | 23.2 | 40.0 | 20.9 | 0.307 | 0.307 |
| 31.8 | 23.2 | 60.0 | 22.7 | 0.297 | 0.296 |
| 31.8 | 23.2 | 80.0 | 21.0 | 0.304 | 0.312 |
| 31.8 | 23.2 | 100.0 | 17.4 | 0.317 | 0.336 |
| 31.8 | 23.2 | 120.0 | 15.8 | 0.293 | 0.299 |
| 31.8 | 23.2 | 140.0 | 18.0 | 0.275 | 0.276 |
| 31.8 | 23.2 | 160.0 | 21.3 | 0.288 | 0.299 |
| 31.8 | 23.2 | 180.0 | 22.2 | 0.320 | 0.342 |
| 31.8 | 23.2 | 200.0 | 20.2 | 0.336 | 0.342 |
| 31.8 | 23.2 | 220.0 | 17.5 | 0.306 | 0.285 |
| 31.8 | 23.2 | 240.0 | 16.8 | 0.274 | 0.264 |
| 31.8 | 23.2 | 260.0 | 18.6 | 0.275 | 0.303 |
| 31.8 | 23.2 | 280.0 | 20.7 | 0.303 | 0.350 |
| 31.8 | 23.2 | 300.0 | 21.0 | 0.319 | 0.333 |
| 31.8 | 23.2 | 400.0 | 20.0 | 0.291 | 0.318 |
| 31.8 | 23.2 | 500.0 | 19.1 | 0.288 | 0.305 |

Table 4 shows modeled data for a 3.3 mm thick clear float glass substrate coated with a 70 nm thick undercoating comprising a mixture of 59 weight % silica and 41% weight percent titania and a functional coating comprising titania. The chromaticity values, Y, x, and y, were determined for different functional layer thickness from 10 nm to 200 nm. The chromaticity values were determined using CIE chromaticity 1931 coordinates for Illuminant C with a 2° Observer.

TABLE 4

Variance of Reflectance and Color with Functional Coating Thickness for an Undercoating Comprising a Mixture of Silica and Titania

| Undercoating Mixture of Silica and Titania [nm] | Functional Coating Titania layer [nm] | Reflected Color | | |
|---|---|---|---|---|
| | | Y | x | y |
| 70 | 10 | 21.36 | 0.327 | 0.342 |
| 70 | 20 | 21.65 | 0.333 | 0.34 |
| 70 | 30 | 22.14 | 0.321 | 0.315 |
| 70 | 40 | 22.63 | 0.305 | 0.291 |
| 70 | 50 | 22.92 | 0.293 | 0.278 |
| 70 | 60 | 22.85 | 0.287 | 0.278 |
| 70 | 70 | 22.42 | 0.287 | 0.29 |
| 70 | 80 | 21.73 | 0.293 | 0.312 |
| 70 | 90 | 21 | 0.303 | 0.335 |
| 70 | 100 | 20.5 | 0.308 | 0.338 |
| 70 | 110 | 20.43 | 0.304 | 0.319 |
| 70 | 120 | 20.83 | 0.296 | 0.295 |
| 70 | 130 | 21.57 | 0.292 | 0.28 |
| 70 | 140 | 22.38 | 0.292 | 0.279 |
| 70 | 150 | 23 | 0.297 | 0.29 |
| 70 | 160 | 23.24 | 0.306 | 0.309 |
| 70 | 170 | 23.03 | 0.315 | 0.328 |
| 70 | 180 | 22.45 | 0.319 | 0.335 |
| 70 | 190 | 21.69 | 0.313 | 0.324 |
| 70 | 200 | 20.98 | 0.302 | 0.303 |

CONCLUSION

The experimental data shows that coated substrates having functional layers of various thicknesses can be prepared with visually acceptable reflective values (reflectance equal to or less than 25%) by using the undercoating of the present invention. The experimental results shown above are system specific. Different results will be obtained depending on the makeup of the undercoating and the functional coating. As shown in Table 2, a specific substrate coated with an undercoating comprising a layer of tin oxide over a layer of silica and a functional coating comprising of a layer of titania can exhibit a reflectance of 25% or less within the recited layer thickness limitations; and in particular as low as 15.8. The system that exhibited the lowest reflectance was made up of an undercoating having a tin oxide layer that is 31.8 nm thick over a silica layer that is 23.2 nm thick and a functional layer comprising a titania layer that is 120.8 nm thick.

As shown in Table 3, for a given undercoating configuration, reflectance values go up and down as the thickness of the functional coating changes. Such behavior is expected because the amount of constructive and destructive interference that occurs is highly system specific. The undercoating exhibited a minimal reflectance at a titania functional coating thickness of 120 nm which is consistent with the solutions in Table 2. The tin oxide and silica oxide undercoating demonstrated good performance (visible reflectance less than or equal to 25%) at a titania functional coating thickness ranging from 20-500 nm.

As shown in Table 4, for a different undercoating configuration, reflectance values also go up and down as the thickness of the functional coating changes. This is similar to that demonstrated by the system of Table 3. The undercoating demonstrated good performance (reflectance less than or equal to 25) at a functional coating thickness ranging from 10-200 nm.

It will be readily appreciated by those skilled in the art that modifications may be made to the invention without departing from the concepts disclosed in the foregoing description. Such modifications are to be considered as included within the scope of the invention. Accordingly, the particular embodiments described in detail hereinabove are illustrative only and are not limiting as to the scope of the invention, which is to be given the full breadth of the appended claims and any and all equivalents thereof.

We claim:

1. A coated substrate comprising:
   a. a substrate having an index of refraction;
   b. an undercoating comprising a graded layer comprising a mixture of at least two materials selected from titania and at least one of tin oxide, silica, and alumina deposited on at least a portion of the substrate, wherein the undercoating consists of inorganic materials; and
   c. an outermost functional coating having an index of refraction deposited on at least a portion of the undercoating, wherein the functional coating is a single layer, photocatalytic coating comprising anatase crystalline titania, and
   wherein the undercoating is configured such that the coated substrate has a visible reflectance of no greater than 25% as measured from the coated side of the substrate.

2. The coated substrate according to claim 1, wherein the undercoating comprises a graded mixture of silica and titania having an index of refraction that is equal to or higher than the index of refraction of the substrate.

3. A coated substrate according to claim 1, wherein the undercoating is a gradient layer comprising titania and at least one of alumina and silica.

4. A coated substrate according to claim 1, wherein the undercoating is applied using a CVD method.

5. A coated substrate according to claim 1, wherein the functional coating is applied using a CVD method.

6. A coated substrate according to claim 1, wherein the substrate is glass.

7. A coated substrate according to claim 6, wherein the substrate is a float glass ribbon.

* * * * *